No. 692,903. Patented Feb. 11, 1902.
F. J. G. RAINBOW.
MEASURING MACHINE FOR PLASTIC MATERIAL.
(Application filed July 29, 1901.)
(No Model.) 2 Sheets—Sheet 1.

WITNESSES:
Isabella Waldron
Mattie K. Lowerre

INVENTOR.
Frederick John Griffin Rainbow
BY
Richardson
ATTORNEYS.

No. 692,903. Patented Feb. 11, 1902.
F. J. G. RAINBOW.
MEASURING MACHINE FOR PLASTIC MATERIAL.
(Application filed July 29, 1901.)

(No Model.) 2 Sheets—Sheet 2.

WITNESSES:
Isabella Waldron
Mattie K. Lowell

INVENTOR
Frederick John Griffin Rainbow
BY
Richards & Co
ATTORNEYS.

UNITED STATES PATENT OFFICE.

FREDERICK JOHN GRIFFIN RAINBOW, OF BARNSTAPLE, ENGLAND.

MEASURING-MACHINE FOR PLASTIC MATERIAL.

SPECIFICATION forming part of Letters Patent No. 692,903, dated February 11, 1902.

Application filed July 29, 1901. Serial No. 70,061. (No model.)

*To all whom it may concern:*

Be it known that I, FREDERICK JOHN GRIFFIN RAINBOW, a subject of the King of Great Britain and Ireland, residing at Pilton, Barnstaple, in the county of Devon, England, have invented an Improved Dividing and Measuring Machine for Dough or Like Plastic Material, (for which I have made application for Letters Patent in Great Britain under No. 5,902, bearing date March 20, 1901,) of which the following is a specification.

This invention relates to that class of dividing and measuring machines for treating dough or like plastic material in which the latter is fed and measured off in a series of pockets; and it consists in improvements by which the dough or plastic material is divided and measured more quickly and accurately with small expenditure of power and by which also a given consistency of the dough or plastic material is obtained while being measured and divided.

Apparatus for the dividing and measuring of dough or like plastic material by feeding the same mechanically into a series of pockets successively presented to a fixed feed-hopper and the delivery of the dough therefrom automatically is known; but for quickness and accuracy of measuring and dividing it is important that the pockets should be quickly presented in succession to the feed-hopper and should remain stationary while receiving their charge, and, further, it is important that the dough or plastic material should be subjected to a certain compression by pressure before and at the time of the delivery into the pocket, and in the case of dough when fed in different quantities or weights from a single machine it is important that the pressure upon the dough should where the delivery of each portion is being limited as to weight and volume be not too great, as otherwise the dough would be "felled" or become heavy and "sad" in baking.

In order that my invention may be the better understood, I will now proceed to describe the same with reference to the drawings hereto annexed and to the letters marked thereon.

Figure 1:
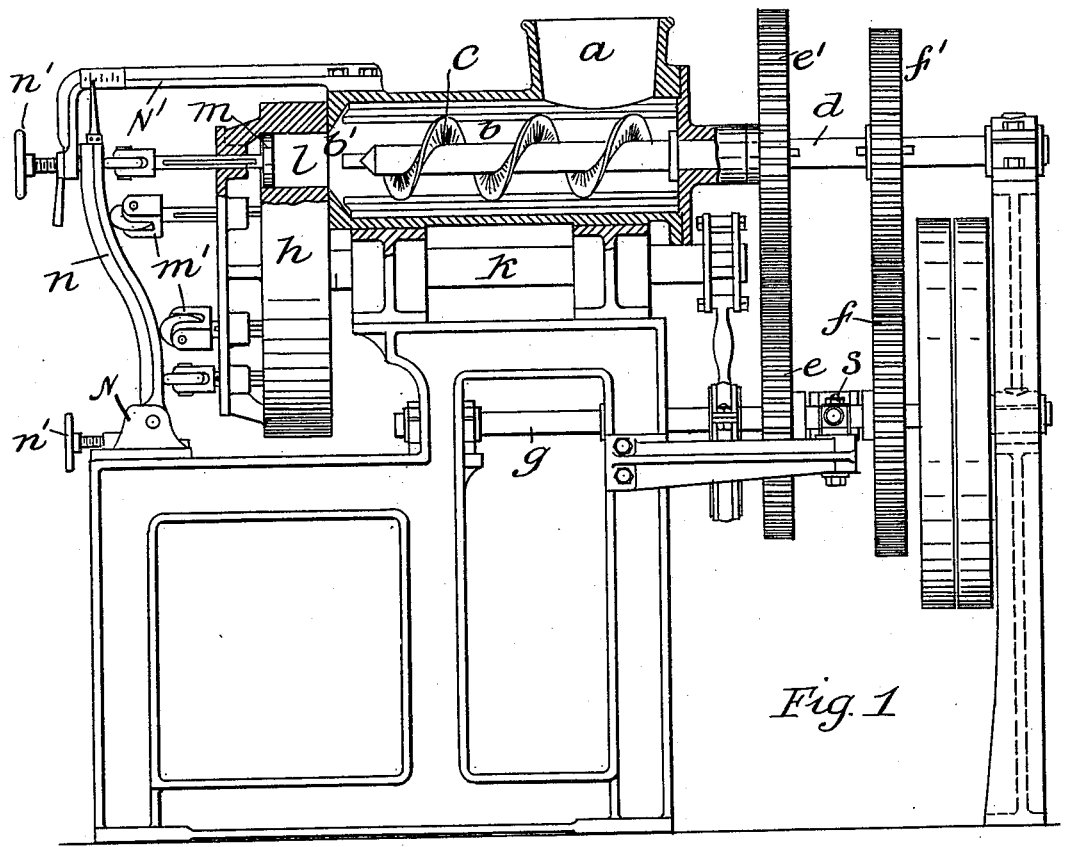
Figure 2:
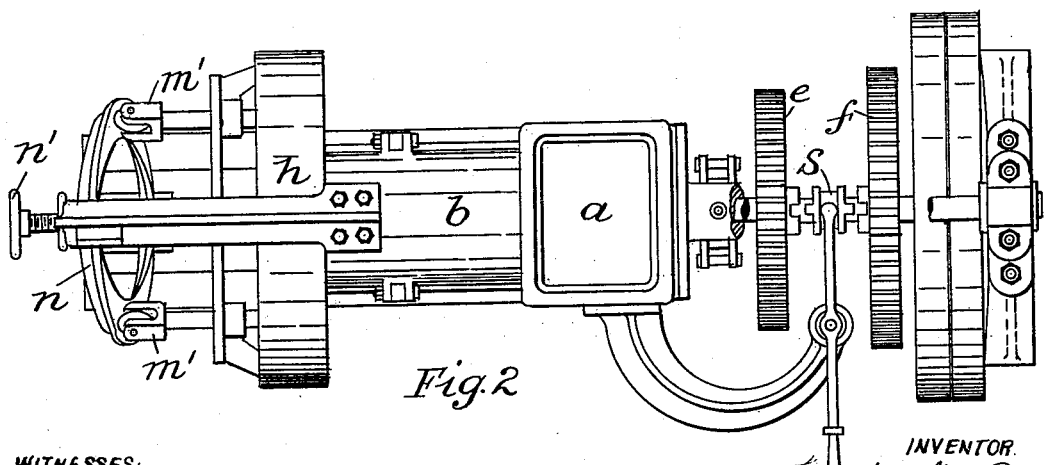
Figure 3:
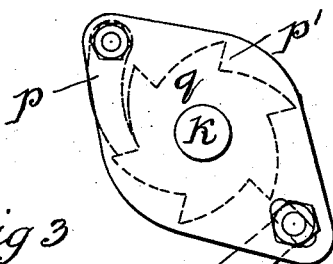
Figure 4:
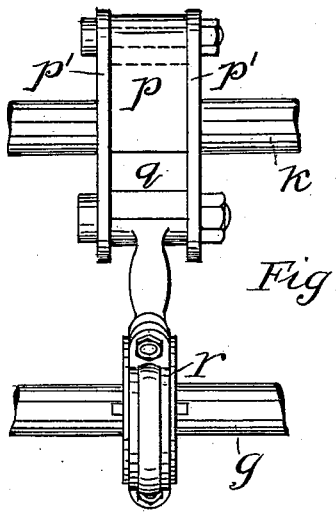
Figure 5:
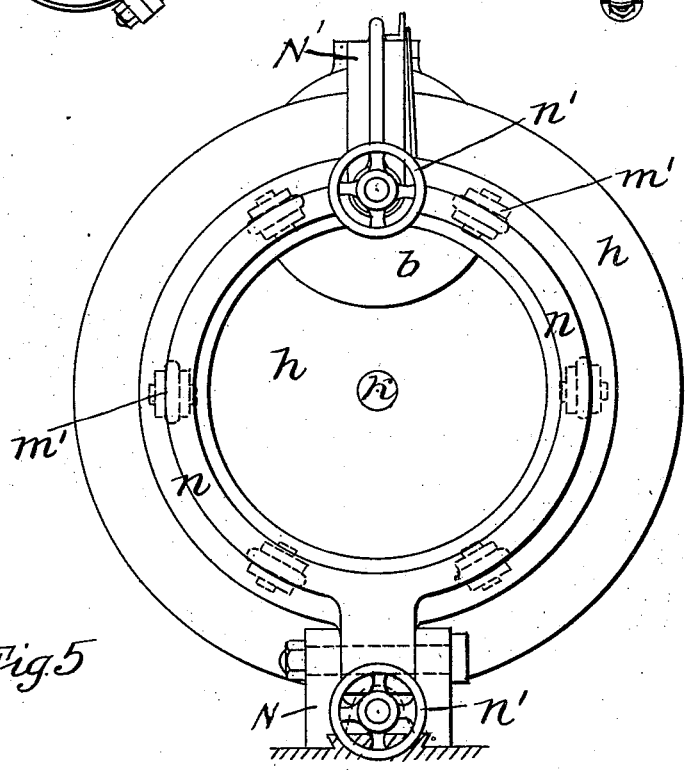

Figure 1 is a part-sectional elevation. Fig. 2 is a plan view with parts broken away. Fig. 3 is a detached detail, in end elevation, of my improved device for giving an intermittent rotation to the mold-disk. Fig. 4 is another elevation of same. Fig. 5 is an end elevation of the discharging-race and mold-disk.

$a$ is the hopper into which the dough is fed.

$b$ is the horizontal feed-cylinder having inside a spiral screw conveyer or presser $c$, fixed to a secondary shaft $d$, operated by alternative differential gear $e$ $e'$ $f$ $f'$ from the first-motion shaft $g$.

$h$ is the mold-disk, mounted on an intermediate shaft $k$ and provided with any convenient number of molds or pockets $l$, each fitted with a sliding piston $m$, of which the rods spring-pressed outward abut by end rollers $m'$ upon an adjustable circular race $n$. This race has its lower end pivotally supported upon a slide N, longitudinally adjustable by means of a hand-screw $n$, while its upper end is adjusted and held by a hand-screw $n'$, passing through the depending end of a bar $N'$. By adjusting the upper screw the maximum volume of the dough or plastic material admitted in the mold or pocket $l$ is determined and by the lower the complete discharge of the said dough or plastic material is regulated as the mold-disk $h$ revolves and the rollers $m'$ travel on the circular race $n$.

The mold-disk $h$ is revolved intermittently by a pawl $p$, pivoted on two cheek-plates $p'$, revolving loosely on the shaft $k$, the pawl engaging with a ratchet-wheel $q$, which has conveniently as many teeth as there are pockets or molds in $h$, keyed to the intermediate shaft $k$, and the cheek-plates $p'$ are operated by the eccentric $r$, keyed on the first-motion shaft $g$. The mold-disk $h$ thus remains quite stationary while the mold or pocket is receiving the charge of dough or plastic material, while the pawl $p$ is making its return stroke and is moved rapidly forward for the presentation of the next pocket or mold to the mouth $b'$ of the horizontal feed-cylinder. During the passing of the disk $h$ from pocket to pocket over the mouth of the feed-cylinder $b$ the dough is slightly compressed by the spiral screw conveyor or presser $c$, thus insuring accuracy of density and thus of weight in each successive volume measured by the machine. As, however, the capacity of the pockets may be adjusted by the race $n$ to very various volumes, the density of the dough or plastic material would tend to increase as the amount of material allowed to escape in the successive pockets decreased, and in the case of dough the increase of density may soon become injurious to the quality of the dough for baking. I have therefore added an alternative differential set of gearing between the first-motion shaft $g$ and the shaft $d$, either the slower or quicker gearing $e$ or $f$, respectively, being used by a sliding clutch $s$, as may be most suitable for the size of dough measured out. The wheels $e'$ $f'$ are loose upon the shaft $d$, while the clutch $s$ slides upon a feather on the shaft $d$. The wheels $e f$ are fixed upon the first-motion shaft $g$, and the fast or slow speed to the screw presser $c$ is conveyed according as the clutch $s$ is put into connection with the wheel $e'$ or the wheel $f'$.

Having now described my said invention, what I claim, and desire to protect by Letters Patent, is—

1. A machine for dividing and measuring dough or plastic material, consisting of in combination a horizontal feeding-cylinder with internal screw presser and feed-hopper; an intermittently-revolving mold or pocket disk coöperating with said feeding-cylinder; means for adjustment of capacity of molds or pockets and for discharge of contents; alternative differential gearing for adjustment of speed of screw presser; and means for producing an intermittent revolution of the said mold-disk constantly in the same direction with dead-stops at moment of feed into pockets.

2. In combination, means for constantly feeding and pressing plastic material toward adjustable pockets or molds; a disk containing a series of pockets or molds adapted to intermittently revolve in front of feeding and pressing device; means for modifying the speed of the pressing device; an eccentric upon a first-motion shaft; and a pawl-and-ratchet gear upon shaft of mold-disk to communicate intermittent rotation thereto constantly in the same direction with dead-stops between.

In witness whereof I have hereunto set my hand in presence of two witnesses.

FREDERICK JOHN GRIFFIN RAINBOW.

Witnesses:
RICHARD A. HOFFMANN,
CHARLES CARTER.